United States Patent [19]
Linder et al.

[11] Patent Number: 5,837,180
[45] Date of Patent: Nov. 17, 1998

[54] COMPOSITE PLASTIC SANITARY FITTING

[75] Inventors: James C. Linder, Shorewood; Jeffrey J. McKenzie, Watertown, both of Minn.

[73] Assignee: Fluoroware, Inc., Chaska, Minn.

[21] Appl. No.: 796,082

[22] Filed: Feb. 5, 1997

[51] Int. Cl.⁶ .................................................. B29C 41/00
[52] U.S. Cl. .................... 264/230; 264/250; 285/148.13; 285/285.1; 285/336; 285/367; 285/423
[58] Field of Search ..................... 285/423, 336, 285/52, 148.13, 285.1, 367; 264/230, 250

[56] References Cited

U.S. PATENT DOCUMENTS

| | | | |
|---|---|---|---|
| Re. 27,141 | 6/1971 | Houot | 285/423 X |
| 3,493,142 | 2/1970 | Assmann | 264/250 X |
| 3,517,950 | 6/1970 | Anderson | 285/52 |
| 3,558,164 | 1/1971 | Havell | 285/423 X |
| 3,633,947 | 1/1972 | Nelson | 285/423 X |
| 3,759,554 | 9/1973 | Carter | 285/423 X |
| 4,104,352 | 8/1978 | Morgan | 264/250 |
| 5,320,389 | 6/1994 | Dupont, Jr. | |
| 5,650,113 | 7/1997 | Gregory et al. | 264/250 |

*Primary Examiner*—Dave W. Arola
*Attorney, Agent, or Firm*—Palmatier, Sjoquist, Voigt & Christensen, P.A.

[57] ABSTRACT

A composite sanitary fitting in which an inner body portion is secured within a overmolded stiffening sleeve which provides strength and rigidity to the fitting. The main body is comprised of a plastic such as PFA and the outer stiffening sleeve is comprised of a more rigid durable plastic such as PEEK. The main body portion has a flange portion which at the connecting end. The stiffening sleeve has an U-shaped portion extends around three sides of the flange locking the sleeve on the body portion.

9 Claims, 4 Drawing Sheets

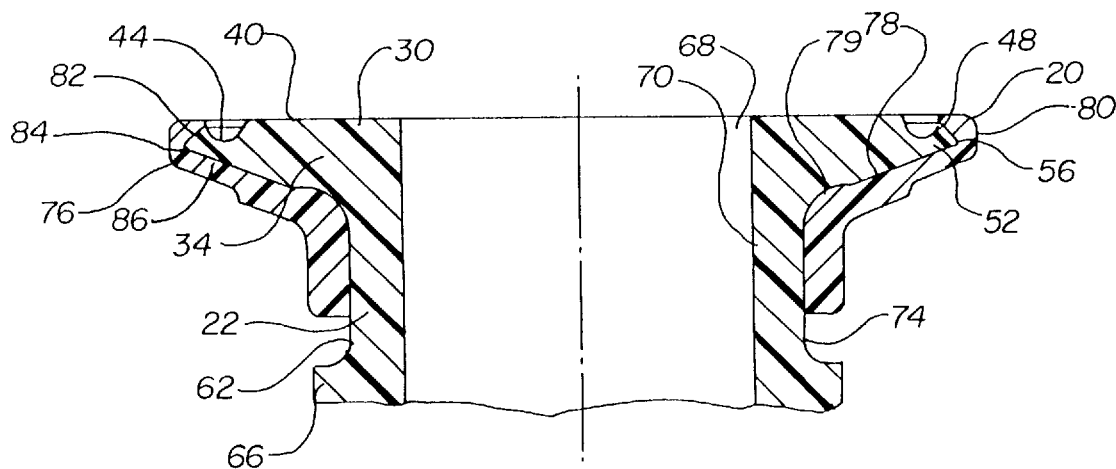
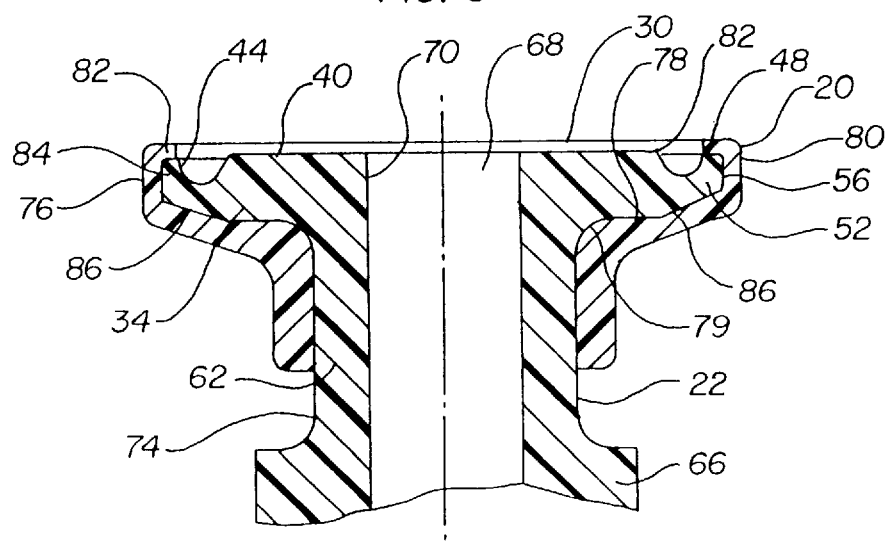
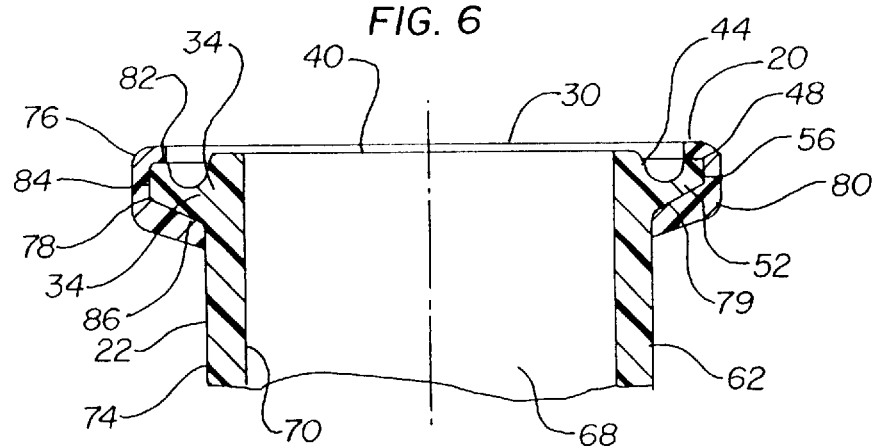

COMPOSITE PLASTIC SANITARY FITTING

BACKGROUND OF THE INVENTION

This invention relates to plastic tubing, piping, hoses, valves, and related connectors. More particularly this patent relates to composite plastic sanitary tubing fittings.

U.S. Code of Federal Code of Regulations, 7 C.F.R. §58.128 provides standards for the food processing and pharmaceutical industries. The conduits for such systems must be smoothed, permit laminar flow of fluids, and be free of discontinuities that could create dead spots where contaminants or impurities may collect.

Traditionally, sanitary systems have been made of stainless steel. The use of stainless steel has some drawbacks and can even be subject to corrosion when used with certain proteins. Additionally, stainless steel pipe and tubing is expensive and difficult to fabricate. Plastic tubing and fittings have been used in sanitary applications. Polypropylene tubing has been used and has been found to be unsatisfactory due to its tendency to degrade quicker than is desirable. The use of PFA in tubing and fittings solves many of the problems associated with the use of stainless steel and other plastics. However, it has been found that PFA still does not provide the necessary stiffness, resiliency, durability and strength in sanitary fittings. The industry standard circumferential clamp for securing together sanitary fittings is shown in FIG. 3. Plastic sanitary fittings have not been satisfactory for coupling with an industry standard stainless steel sanitary fitting utilizing such circumferential clamp.

Prior art composite fittings such as those shown in FIGS. 1 and 2 comprise separate joined parts such as an inner body portion 10, an inner flange portion 11, an outer stiffening sleeve 13, and an inner flange portion 14. These designs have a potential for separating due to insufficient connecting portions 15. In addition, these prior art composite fittings may have an inner body portion 10 of uneven interior diameter 16 and exterior diameter 17 as shown in FIG. 1, thus creating the potential for dead spots which may collect contaminants. No composite fitting known to applicants have utilized PEEK. It would be desirable to have a composite plastic sanitary fitting suitable for use with industry standard stainless steel circumferential clamping tools. Moreover, it would be desirable to have a composite plastic sanitary fitting in which the composite parts are locked together in engagement.

SUMMARY OF THE INVENTION

A composite sanitary fitting in which an inner body portion is secured within a overmolded stiffening sleeve which provides strength and rigidity to the fitting. The main body is comprised of a plastic such as PFA and the outer stiffening sleeve is comprised of a more rigid durable plastic such as PEEK. The main body portion has a flange portion which at the connecting end. The stiffening sleeve has an U-shaped portion extends around three sides of the flange locking the sleeve on the body portion.

BRIEF DESCRIPTION OF THE DRAWINGS

FIG. 4 is a cross-sectional view of a composite sanitary coupling according to the invention.

FIG. 5 is a cross-sectional view of another composite sanitary fitting according to the invention.

FIG. 6 is a cross-sectional view of another composite sanitary fitting according to the invention.

DETAILED SPECIFICATION

Figure 1:
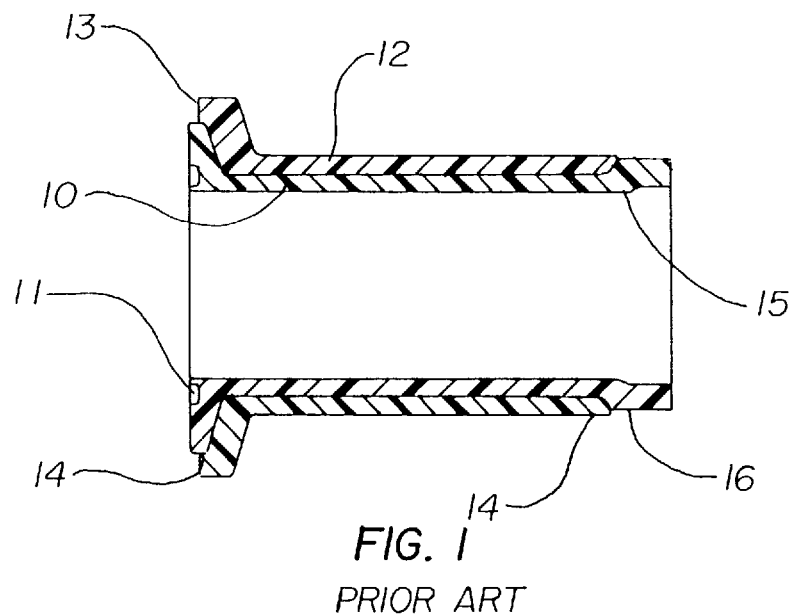
FIG. 1 is a cross-sectional view of a prior art composite fitting utilizing a stiffening sleeve on the exterior of a body with the stiffening sleeve abutted against the flange.
Figure 2:
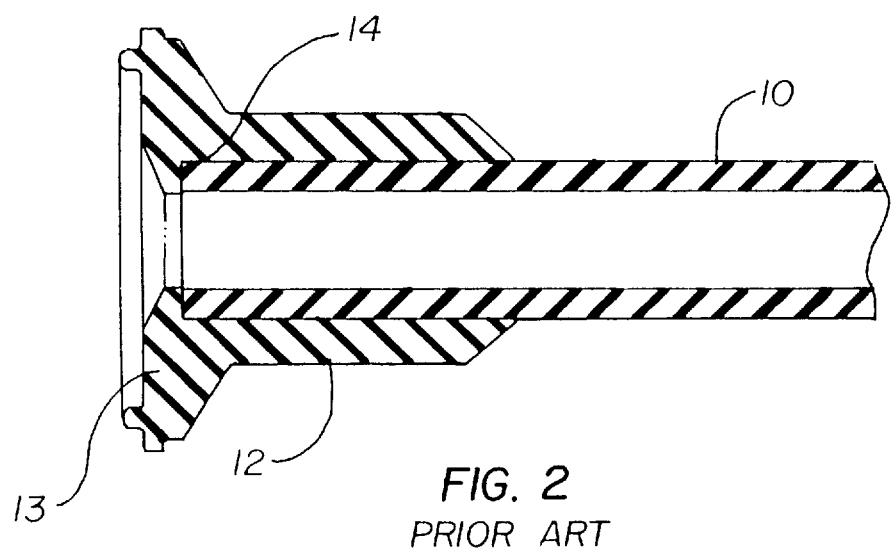
FIG. 2 is a cross-sectional view of a prior art composite fitting in which the flange is made entirely of the stiffening material and in which the stiffening sleeve is not locked on the body of the inner member.

Referring to FIGS. 4, 5, 6, 7, and 8, composite sanitary fittings in accordance with the invention are shown and are generally indicated with the numeral 20. Composite fittings 20 principally comprise an inner body 22 and a stiffening sleeve 76.

The inner body 22 is preferably formed from injection molded PFA but can be formed of other thermoplastics. Said inner body 22 has a sanitary fitting connecting end 30 on which is located a flange portion 34. The sanitary fitting connecting end 30 and the flange portion 34 have an end surface 40 including an O-ring groove 44. Radially exterior to the O-ring groove is an outer annular edge portion 48. The flange portion further has a circumferential lip portion 52 and an outwardly facing circumferential flange portion surface 56.

Adjacent to the flange portion 34, the inner body 22 has a neck portion 62 and adjacent to said neck portion 62 is a collar portion 66 located on several of the embodiments, namely FIGS. 4, 5, 8, and 9. The inner body 22 further has a smooth inner bore 68 with a smooth inwardly facing surface 70 and an exterior surface 74.

Still referring to FIGS. 4, 5, 6, 7, and 8 the composite plastic fittings also have a stiffening ring or sleeve 76 which has an inner surface 78 adhered to the outer surface 74 of the inner body at an interface 79. The stiffening sleeve 76 has an U-shaped portion 80 which engages the circumferential lip portion 52 and extends around three sides, the front side 82, the outer side 84, and the back side 86 of said flange portion. The stiffening ring 76 is thus constrained or locked on the inner body 22 by way of said configuration. In FIG. 6 the stiffening sleeve 76 is shown to extend only down the back side and terminates at the neck portion 62 of the inner body 22. FIGS. 4 and 5 illustrate a configuration in which the stiffening sleeve extends axially down the neck portion. An ideal preferred material for the stiffening sleeve is PEEK which has sufficient strength to secure the sleeve on the flange portion and further provides sufficient strength and durability to allow clamping of the fitting together with other like fittings or with a stainless steel fitting such as shown in FIG. 9.

Figure 3:
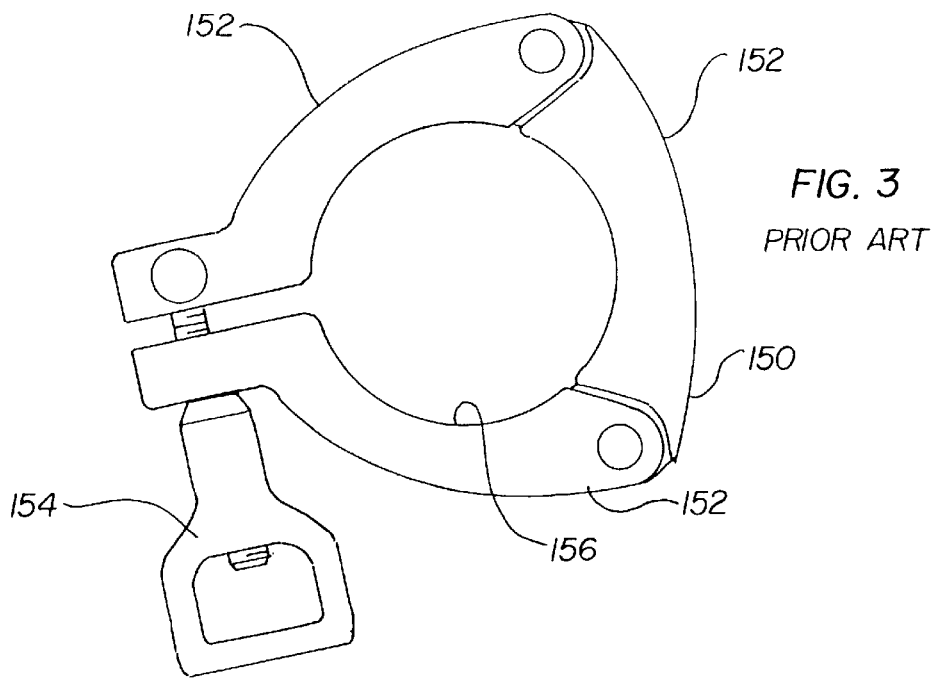
FIG. 3 is a plan view of a prior art steel clamping device for securing together prior art stainless steel sanitary couplings.

Referring to FIG. 3, a prior art circumferential clamping tool 150 is depicted which utilizes three hinged sections 152 which may be tightened by way of a tightening nut 154, thus reducing the inner diameter 156 of the tool 150.

U-shaped portion 80 of the stiffening ring 76 combines with the flange portion 34 to form the flange 90 of the composite plastic fitting. Said flange has an inclined back side 91.

Figure 9:
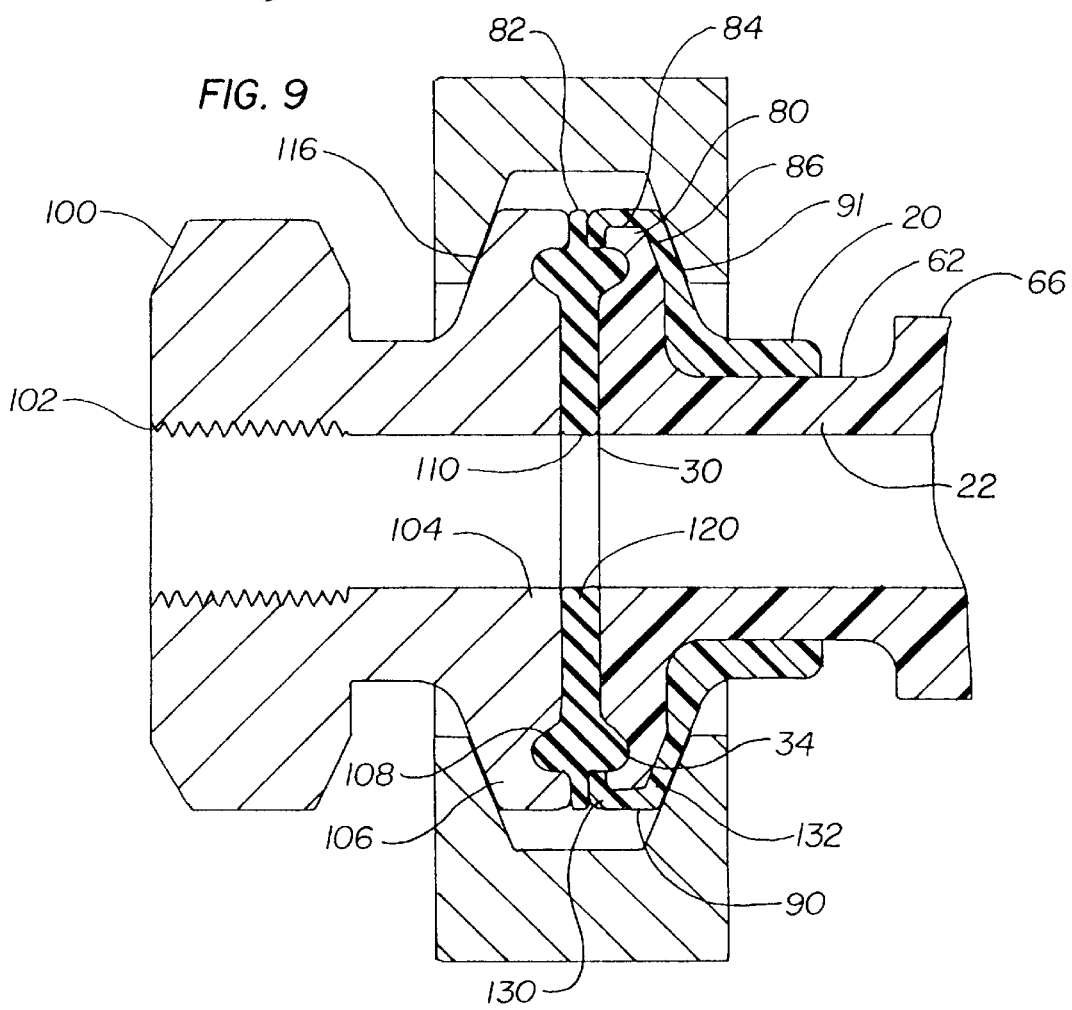
FIG. 9 is a cross-sectional view of a composite plastic fitting according to the invention joined together with a conventional stainless steel sanitary fitting by way of a prior art conventional steel clamp such as shown in FIG. 3.
Figure 7:
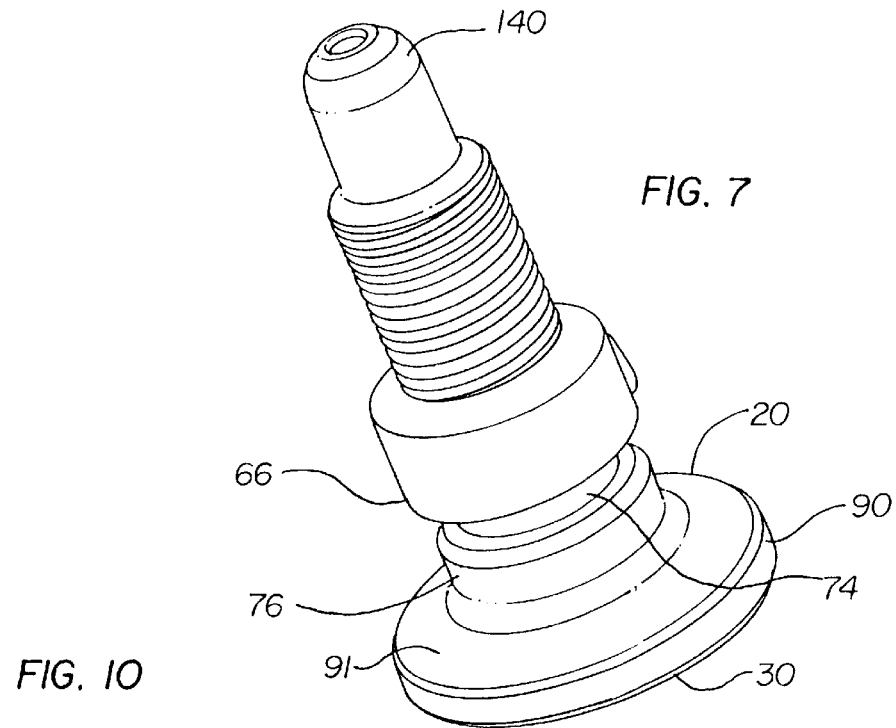
FIG. 7 is a perspective view of a sanitary fitting according to the invention with a flared fitting on the end opposite the sanitary fitting.

Referring to FIG. 9 a conventional stainless steel sanitary fitting 100 is shown on the left portion of the figure. Said stainless steel fitting has a threaded end 102 and a flanged end 104. The flanged end 104 has a flange 106 with an O-ring groove 108. The flange 106 and flange end 104 have a connecting end 110. The flange 106 has an incline surface back side 116 similar to the plastic composite fitting.

The clamping tool 150 engages the inclined back sides 91, 116 of the fitting flanges 90 and 106 and operates as a reversed compressive wedge to compress the confronting connecting ends 30, 110 together. A rubber sealing gasket 120 is compressed when the tightening nut 154 is forming a seal of high integrity between the respective fittings. Significantly, as shown in FIG. 9 when the compressive clamp 150 is engaged, the flange portion of the inner body 34 is compressed between an inner lip 130 of the U-shaped portion and the back side portion 132 of the U-shaped portion of the stiffening sleeve. The clamping thus provides a self-locking action to maintain the stiffening sleeve 76 on the flange portion 34 and provides a more durable and rigid stiffening sleeve 130 to confront and engage the rubber gasket 120 and cooperating fitting.

Figure 8:
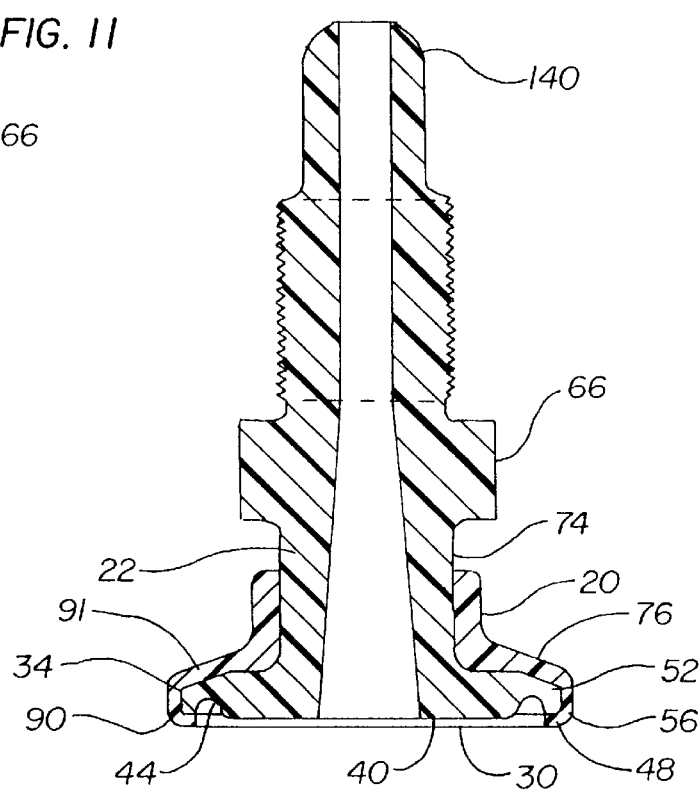
FIG. 8 is a cross-sectional view of the fitting shown in FIG. 7.

The fitting shown in FIG. 8 may be utilized in conjunction with a stainless steel sanitary fitting and provides a means of attaching a flared end tube to the nipple 140 to provide a convenient conversion means to a plastic sanitary tubing system.

Figure 10:
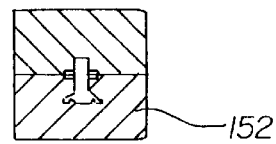
FIG. 10 illustrates a cross-sectional view of a mold for the body portion.
Figure 11:
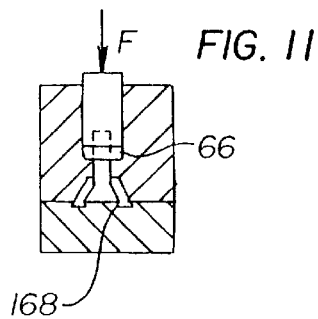
FIG. 11 illustrates a cross-sectional view of the overmolding of the stiffening sleeve.

Referring to FIGS. 10 and 11, the composite plastic fittings are generally formed as follows. First, the inner body portion is injection molded of PFA in a mold 152. The molded body portion is allowed to cool and is ejected from the molding equipment. The inner body is then baked at approximately 500° for several hours to preshrink said fitting. The preshrunk inner body portion is placed into an overmold with an axial compressive force placed on the inner body such as at the collar 66 to create a lower interface 168 of high integrity between the connecting end and the mold. The PEEK is injected under high pressure into an overmold cavity surrounding the flange portion of the inner body and stops at the preloaded interface between the connecting end and the mold provided by the axial loading. The composite molded part is allowed to cool and is ejected from the molding equipment. As shown in FIGS. 4, 5, 6 and 8 the interface corresponds to the end of the stiffening sleeve at the O-ring groove.

In actual use, plastic clamps which are known may also be utilized to clamp these fittings.

"Fittings" when used herein should be understood to include connectors attached to or associated with tubing, pipes, adapters, valves and any other equipment in fluid or sanitary systems.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

We claim:

1. A method of manufacturing a composite fitting comprising the steps of:

1) injection molding a body portion comprising of PFA having a connecting end with a flange portion at said connecting end;

2) baking said body portion at an elevated temperature whereby said body portion shrinks;

3) preloading the body portion in a mold at an interface at the connecting end; and 4) injecting molten PEEK into a mold cavity extending around the flange portion thereby forming a sleeve around the body portion.

2. The method of claim 1, further comprising the step of forming a circular groove at the connecting end when the body portion is injection molded.

3. The method of claim 2, wherein the preloading of the body portion is axial and the interface is at the circular groove whereby the sleeve terminates at the circular groove.

4. The method of claim 1, wherein the preloading is axial and the preloading is at the interface.

5. The method of claim 1, wherein the connecting end has an outwardly facing end surface transverse to the fitting axis, and the body portion is preloaded at said end surface.

6. A method of manufacturing a composite fitting comprising the steps of:

1) injection molding a plastic body portion having a connecting end with a flange portion at said connecting end, the flange portion having an axially facing end surface on said connecting end with a circular groove;

2) preloading the body portion in a mold with the preloading at an interface at the circular groove on the connecting end; and 3) injecting molten plastic into a mold cavity extending around the flange portion to form a sleeve around the body portion at the flange, said plastic having greater rigidity than that of the body portion.

7. The method of claim 6, wherein the body portion is injection molded of PFA.

8. The method of claim 7, wherein the body portion is baked thereby shrinking said body portion before the sleeve is formed thereon.

9. The method of claim 6, wherein the sleeve is injection molded of PEEK.

* * * * *